(12) United States Patent
Ji

(10) Patent No.: US 8,698,357 B2
(45) Date of Patent: Apr. 15, 2014

(54) MULTIPLE POWER SUPPLY DEVICE

(75) Inventor: Hai-Yi Ji, Shanghai (CN)

(73) Assignee: Inventec Corporation, Taipei (TW)

( * ) Notice: Subject to any disclaimer, the term of this patent is extended or adjusted under 35 U.S.C. 154(b) by 533 days.

(21) Appl. No.: 13/012,809

(22) Filed: Jan. 25, 2011

(65) Prior Publication Data

US 2012/0126632 A1    May 24, 2012

(30) Foreign Application Priority Data

Nov. 18, 2010   (CN) .......................... 2010 1 0556487

(51) Int. Cl.
*H01H 19/14*   (2006.01)
*H02J 3/38*   (2006.01)
*H02J 7/00*   (2006.01)
*H02J 9/00*   (2006.01)
*H04B 3/00*   (2006.01)
*H02J 1/00*   (2006.01)
*H02J 3/00*   (2006.01)

(52) U.S. Cl.
USPC .................. 307/115; 307/64; 307/65; 307/44; 307/80; 307/85

(58) Field of Classification Search
None
See application file for complete search history.

(56) References Cited

U.S. PATENT DOCUMENTS

| | | |
|---|---|---|
| 2001/0040812 A1 | 11/2001 | Jitaru |
| 2007/0040451 A1* | 2/2007 | Hadzimusic et al. ......... 307/116 |
| 2007/0273216 A1* | 11/2007 | Farbarik .......................... 307/86 |
| 2010/0238751 A1* | 9/2010 | Dell et al. ...................... 365/226 |
| 2011/0113263 A1* | 5/2011 | Bi et al. .......................... 713/300 |
| 2011/0278936 A1* | 11/2011 | Rahman et al. ................. 307/80 |

FOREIGN PATENT DOCUMENTS

| | | |
|---|---|---|
| CN | 1728499 A | 2/2006 |
| CN | 101427196 A | 5/2009 |
| CN | 101471599 A | 7/2009 |
| CN | 101752900 A | 6/2010 |
| CN | 101764425 A | 6/2010 |
| CN | 101874272 A | 10/2010 |
| TW | 288607 | 10/1996 |
| TW | 200412004 | 7/2004 |
| TW | 200937855 A | 9/2009 |
| TW | 200947194 A | 11/2009 |

\* cited by examiner

*Primary Examiner* — Jared Fureman
*Assistant Examiner* — Aqeel Bukhari
(74) *Attorney, Agent, or Firm* — CKC & Partners Co., Ltd.

(57) ABSTRACT

A multiple power supply device including a power consuming unit, a plurality of power supply units, and a plurality of switching units is provided. The power consuming unit receives a plurality of power good signals, and outputs a plurality of power control signals accordingly. The power supply units output a plurality of working voltages respectively, and meanwhile output the power good signals. When the power consuming unit is in a working state and one of the power good signals is enabled, the power consuming unit enables the corresponding power control signal. When the power consuming unit is in a working state and a part of the power good signals are enabled, the power consuming unit enables one of the power control signals corresponding to the enabled power good signals. The switching units transmit the corresponding working voltage to the power consuming unit according to the enabled power control signal.

10 Claims, 2 Drawing Sheets

MULTIPLE POWER SUPPLY DEVICE

CROSS-REFERENCE TO RELATED APPLICATION

This application claims the priority benefit of China application Ser. No. 201010556487.3, filed on Nov. 18, 2010. The entirety of the above-mentioned patent application is hereby incorporated by reference herein and made a part of this specification.

BACKGROUND OF THE INVENTION

1. Field of the Invention

The present invention generally relates to a power supply device, in particular, to a multiple power supply device.

2. Description of Related Art

A programmable chip is widely used in server system designs as it can be flexibly adjusted by programming, and the programmable chip includes, for example, a complex programmable logic device (CPLD) and a field programmable gate array (FPGA). In conventional designs, the power supply to the programmable chip is steady and unique. However, with the ever increasing of system complexity, the programmable chip may have a plurality of power supplies, and needs to select one from the plurality of power supplies and switch to the selected power supply.

SUMMARY OF THE INVENTION

Accordingly, the present invention is directed to a multiple power supply device, which can automatically select a working voltage output by a plurality of power supply units.

The present invention provides a multiple power supply device, which includes a power consuming unit, a plurality of power supply units, and a plurality of switching units. The power consuming unit has a power receiving terminal and a plurality of detection terminals. The detection terminals receive a plurality of power good signals respectively, and the power consuming unit outputs a plurality of power control signals according to the power good signals. The power supply units are used to output a plurality of working voltages respectively, and output the power good signals correspondingly when outputting the working voltages. The switching units are coupled to the power receiving terminal, and are coupled to the power supply units respectively. When the power consuming unit is in a working state and one of the power good signals is enabled, the power consuming unit enables the corresponding power control signal, and the switching units transmit the corresponding working voltage to the power receiving terminal according to the enabled power control signal. When the power consuming unit is in a working state and a part of the power good signals are enabled, the power consuming unit enables one of the power control signals corresponding to the enabled power good signals, and the switching units transmit the corresponding working voltage to the power receiving terminal according to the enabled power control signal.

In an embodiment of the present invention, when the power consuming unit is not started and one of the power supply units outputs the working voltage, the switching unit that receives the working voltage outputs a starting voltage to the power receiving terminal. When the power consuming unit is not started and a part of the power supply units output the working voltages, one of the switching units that receive the working voltages outputs the starting voltage to the power receiving terminal.

In an embodiment of the present invention, the switching units include switches and diodes. A first terminal of the switch is coupled to a corresponding power supply unit, a second terminal of the switch is coupled to the power receiving terminal of the power consuming unit, and a control terminal of the switch receives the corresponding power control signal. The diode is forward coupled between the first terminal and the second terminal of the switch. When the power consuming unit is not started and one of the power supply units outputs the working voltage, the corresponding diode in the switching units is forward conducted, outputs a starting voltage according to the working voltage, and transmits the starting voltage to the power receiving terminal of the power consuming unit, so that the power consuming unit is actuated and starts working. When the power consuming unit is not started and a part of the power supply units output the working voltages, the diode that receives the working voltage first among the diodes in the switching units is forward conducted, outputs the starting voltage according to the received working voltage, and transmits the starting voltage to the power receiving terminal of the power consuming unit, so that the power consuming unit is actuated and starts working. When the power consuming unit is in a working state and one of the power good signals is enabled, the corresponding power control signal is enabled to conduct the corresponding switch in the switching units, and the working voltage is transmitted to the power receiving terminal of the power consuming unit through the conducted switch. When the power consuming unit is in a working state and a part of the power good signals are enabled, one of the power control signals is enabled correspondingly to conduct the corresponding switch in the switching units, and the working voltage is provided to the power receiving terminal of the power consuming unit through the conducted switch.

In an embodiment of the present invention, when the power consuming unit is not started, all of the power good signals are disabled, and all of the switches are turned off.

In an embodiment of the present invention, when one of the diodes is forward conducted, the other diodes are all cut off.

In an embodiment of the present invention, the starting voltage is lower than the working voltage.

In an embodiment of the present invention, the switches are P-channel metal-oxide-semiconductor (PMOS) transistors.

In an embodiment of the present invention, the power supply units are a plurality of power supply.

In an embodiment of the present invention, the power supply units are a plurality of power converters.

In an embodiment of the present invention, the power consuming unit is a programmable chip, and the power consuming unit is a CPLD or an FPGA.

In view of the above, in the multiple power supply device of the present invention, the power consuming unit automatically selects the working voltage output by one of the power supply units according to the power good signal. Before the power consuming unit is started, one of the switching units generates a starting voltage according to the working voltage output by the power supply units, and transmits the starting voltage to the power consuming unit.

In order to make the aforementioned features and advantages of the present invention more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
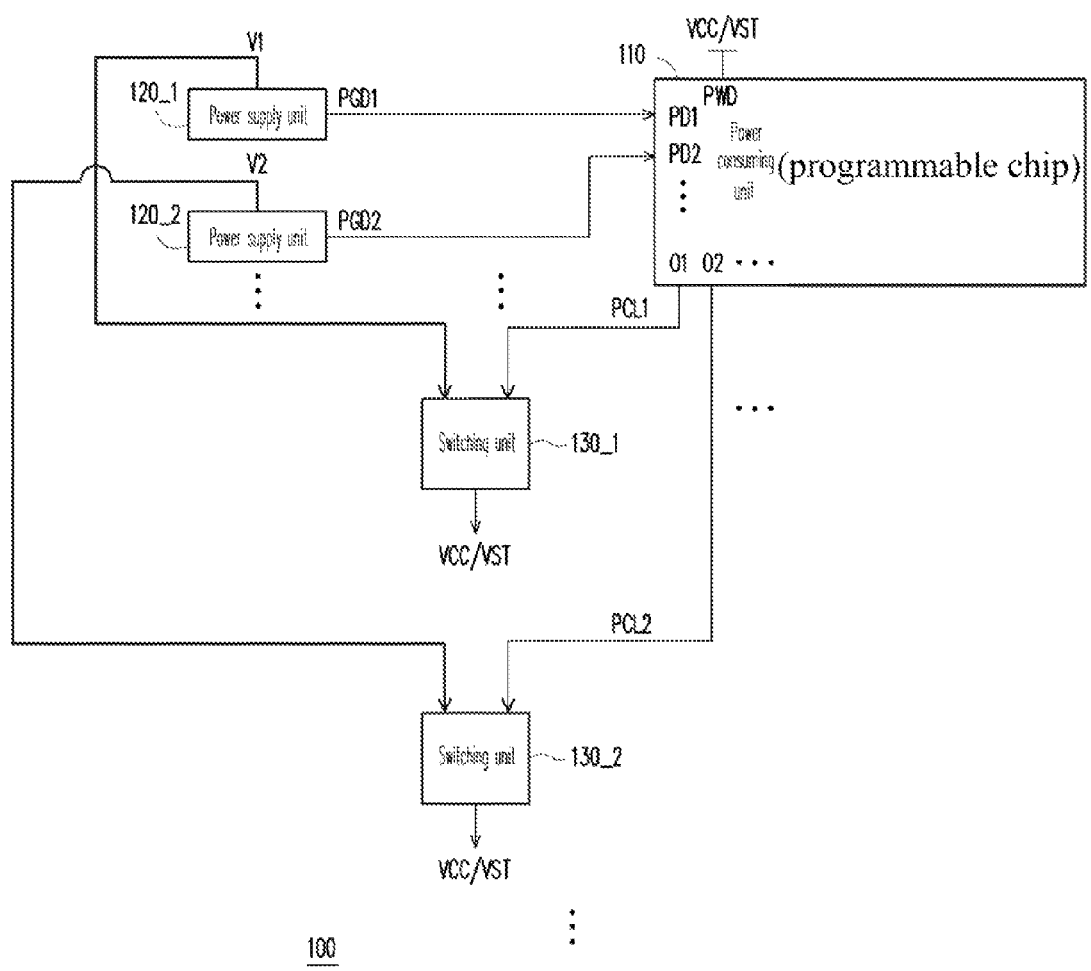
FIG. 1 is a system schematic view of a multiple power supply device according to an embodiment of the present invention.

Reference will now be made in detail to the present embodiments of the invention, examples of which are illustrated in the accompanying drawings. Wherever possible, the same reference numbers are used in the drawings and the description to refer to the same or like parts.

Currently, with the ever increasing of system complexity, a programmable chip may be shared by a plurality of main boards, so that the programmable chip may be required to select one voltage from a plurality of voltages and switch a working voltage to the selected one. In a system having multiple main boards, when an expansion card with a programmable chip is shared by the main boards, since one or more of the main boards can be switched on and the main boards to be switched on are not fixed, the design of a circuit applying the programmable chip has the following requirements. When any one of the main boards is in a working state, the programmable chip uses a voltage of the working main board as the working voltage; and when multiple main boards are in a working state simultaneously, the programmable chip uses a voltage corresponding to one of the working main boards as the working voltage.

FIG. 1 is a system schematic view of a multiple power supply device according to an embodiment of the present invention. Referring to FIG. 1, the multiple power supply device 100 includes a power consuming unit 110, a plurality of power supply units (e.g. 120_1, 120_2, . . . ), and a plurality of switching units (e.g. 130_1, 130_2, . . . ). The power consuming unit 110 may be a programmable chip, and may also be a CPLD or an FPGA. The power supply units 120_1, 120_2, . . . output voltages (e.g. V1, V2, . . . ), and output power good signals (e.g. PGD1, PGD2, . . . ) when outputting the voltages, in which the voltages V1, V2, . . . are substantially the same.

The power consuming unit 110 has a power receiving terminal PWD, a plurality of detection terminals (e.g. PD1, PD2, . . . ), and a plurality of output terminals (e.g. O1, O2, . . . ). The power receiving terminal PWD is used to receive a working voltage VCC to actuate the power consuming unit 110 to work. The detection terminals PD1, PD2, . . . receive the power good signals PGD1, PGD2, . . . respectively. The power consuming unit 110 outputs a plurality of power control signals (e.g. PCL1, PCL2, . . . ) at the output terminals O1, O2, . . . according to the power good signals PGD1, PGD2, . . . respectively. The switching units 130_1, 130_2, . . . are coupled to the power consuming unit 110, and are coupled to the power supply units 120_1, 120_2, . . . respectively.

When the power consuming unit 110 is in a working state, and one of the power good signals PGD1, PGD2, . . . is enabled, the power consuming unit 110 enables the corresponding power control signal (e.g. PCL1, PCL2, . . . ). The switching units 130_1, 130_2, . . . transmit a corresponding voltage (e.g. V1, V2, . . . ) to the power consuming unit 110 according to the enabled power control signal (e.g. PCL1, PCL2, . . . ), and the corresponding voltage is used as the working voltage VCC of the power consuming unit 110. The working voltage VCC is substantially equal to the voltage V1 or V2. When the power consuming unit 110 is in a working state, and a part of the power good signals PGD1, PGD2, . . . are enabled, the power consuming unit 110 enables one of the power control signals (e.g. PCL1, PCL2, . . . ) corresponding to the enabled power good signals (e.g. PGD1, PGD2, . . . ). The switching units 130_1, 130_2, . . . transmits a corresponding voltage (e.g. V1, V2, . . . ) to the power consuming unit 110 according to the enabled power control signal (e.g. PCL1, PCL2, . . . ), and the corresponding voltage is used as the working voltage VCC of the power consuming unit 110.

For example, when the power consuming unit 110 is in a working state and the power supply unit 120_1 outputs the voltage V1, the power good signal PGD1 is enabled. In this case, the power consuming unit 110 enables the power control signal PCL1, and the switching unit 130_1 transmits the voltage V1 to the power receiving terminal PWD of the power consuming unit 110 according to the enabled power control signal PCL1, in which the voltage V1 is used as the working voltage VCC of the power consuming unit 110. When the power consuming unit 110 is in a working state and the power supply units 120_1 and 120_2 output the voltages V1 and V2 respectively, the power good signals PGD1 and PGD2 are enabled. In this case, the power consuming unit 110 enables one of the power control signals PCL1 and PCL2, and one of the switching units 130_1 and 130_2 transmits the voltage (e.g. V1 or V2) to the power receiving terminal PWD of the power consuming unit 110 according to the enabled power control signal (e.g. PCL1 or PCL2), in which the voltage (e.g. V1 or V2) is used as the working voltage VCC of the power consuming unit 110.

In addition, when the power consuming unit 110 is not started and one of the power supply units 120_1, 120_2, . . . outputs a voltage (e.g. V1, V2, . . . ), the switching unit (e.g. 130_1, 130_2, . . . ) that receives the voltage (e.g. V1, V2, . . . ) outputs a starting voltage VST according to the received voltage (e.g. V1, V2, . . . ), and transmits the starting voltage VST to the power consuming unit 110, so as to actuate the power consuming unit 110. When the power consuming unit 110 is not started and a part of the power supply units 120_1, 120_2, . . . output voltages (e.g. V1, V2, . . . ), one of the switching units (e.g. 130_1, 130_2, . . . ) that receive the voltages (e.g. V1, V2, . . . ) outputs a starting voltage VST according to the received voltage (e.g. V1, V2, . . . ), and transmits the starting voltage VST to the power consuming unit 110, so as to actuate the power consuming unit 110. In particular, the starting voltage VST is lower than the working voltage VCC.

For example, when the power consuming unit 110 is not started and the power supply unit 120_1 outputs a voltage V1, the switching unit 130_1 outputs a starting voltage VST according to the voltage V1, and transmits the starting voltage VST to the power receiving terminal PWD of the power consuming unit 110, so as to actuate the power consuming unit 110. When the power consuming unit 110 is not started and the power supply units 120_1 and 120_2 output voltages V1 and V2 respectively, one of the switching units 130_1 and 130_2 outputs a starting voltage VST according to a voltage (e.g. V1 or V2), and transmits the starting voltage VST to the power receiving terminal PWD of the power consuming unit 110, so as to actuate the power consuming unit 110. The other one of the switching units 130_1 and 130_2 does not perform any action.

Figure 2:
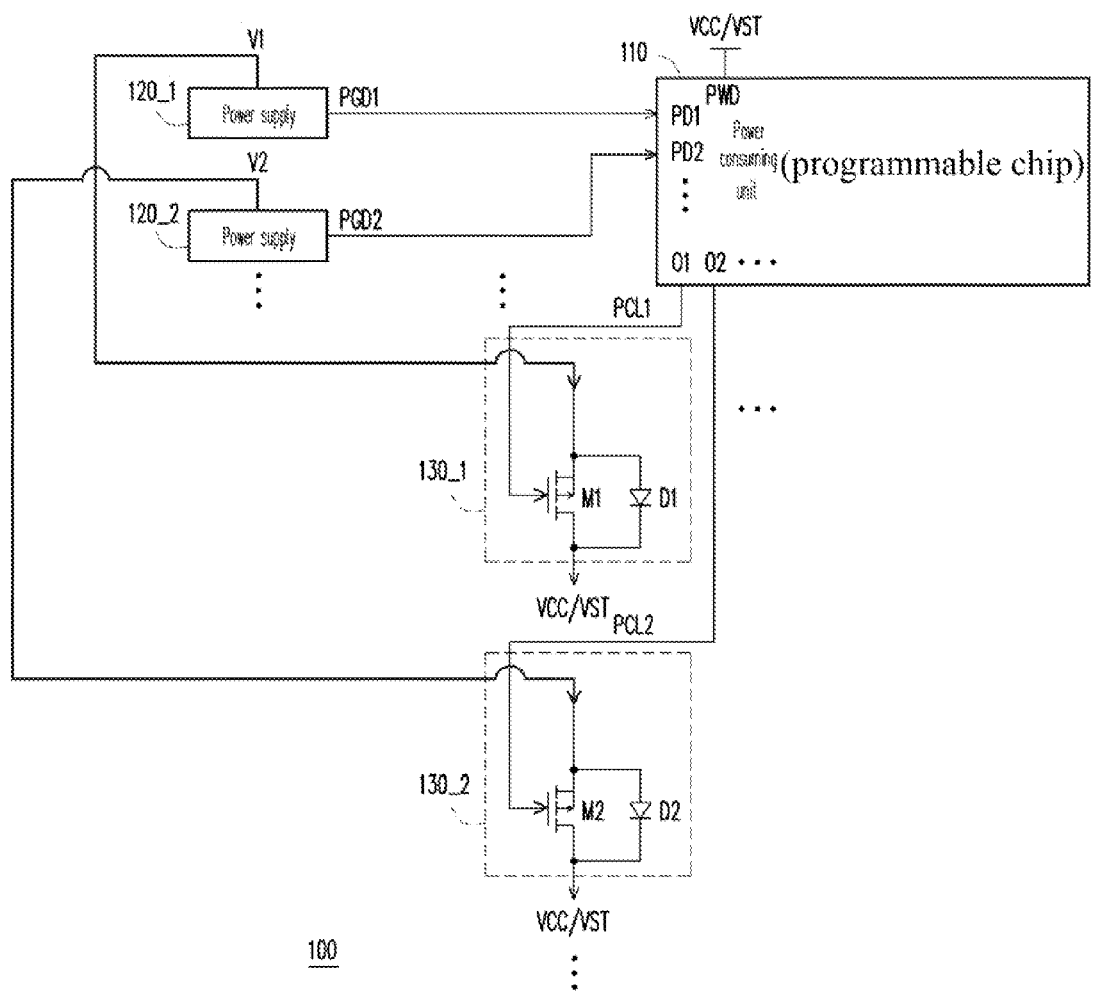
FIG. 2 is a schematic circuit diagram of a multiple power supply device according to an embodiment of the present invention.

FIG. 2 is a schematic circuit diagram of a multiple power supply device according to an embodiment of the present invention. Referring to FIG. 1 and FIG. 2, in this embodiment, the power supply units 120_1, 120_2, . . . may be, for example, power supply 120_1, 120_2, . . . , while in other embodiments, the power supply units may be power converters. Additionally, the switching unit 130_1 includes a transistor M1 and a diode D1, the switching unit 130_2 includes a transistor M2 and a diode D2, and the structures of the other switching units are the same as those of the switching units 130_1 and 130_2, the details of which will not be described herein again. The transistors M1 and M2 may be, for example, PMOS transistors, and each of the transistors may be regarded as a switch.

A source (that is, a first terminal) of the transistor M1 is coupled to the power supply 120_1 to receive a voltage V1, a drain (that is, a second terminal) of the transistor M1 is coupled to the power receiving terminal PWD of the power consuming unit 110 to output a working voltage VCC to the power receiving terminal PWD of the power consuming unit 110, and a gate (that is, a control terminal) of the transistor M1 receives a power control signal PCL1. The diode D1 is forward coupled between the drain and the source of the transistor M1. That is to say, an anode of the diode D1 is coupled to the source of the transistor M1, and a cathode of the diode D1 is coupled to the drain of the transistor M1.

A source of the transistor M2 is coupled to the power supply 120_2 to receive a voltage V2, a drain of the transistor M2 is coupled to the power receiving terminal PWD of the power consuming unit 110 to output a working voltage VCC to the power receiving terminal PWD of the power consuming unit 110, and a gate of the transistor M2 receives a power control signal PCL2. The diode D2 is forward coupled between the drain and the source of the transistor M2. That is to say, an anode of the diode D2 is coupled to the source of the transistor M2, and a cathode of the diode D2 is coupled to the drain of the transistor M2. The rest can be deduced in the same manner, and will not be described herein again.

When none of the power supply apparatuses 120_1, 120_2, . . . are switched on, none of the main boards are switched on. In this case, the power supply apparatuses 120_1, 120_2, . . . cannot supply voltages V1, V2, . . . , the power good signals PGD1, PGD2, . . . are disabled (for example, at a low voltage level), the transistors M1, M2, . . . are not conducted (equivalent to turn-off of the switches), and the diodes D1, D2, . . . are cut off. Since the voltages V1, V2, . . . cannot be transmitted to the power receiving terminal PWD of the power consuming unit 110 to serve as the working voltage VCC, and the diodes D1, D2, . . . cannot generate a starting voltage VST according to the voltages V1, V2, . . . , the power consuming unit 110 is not actuated.

When one of the power supply apparatuses 120_1, 1202, . . . is switched on, a corresponding main board is switched on. Assuming that the power supply switched on is the power supply 120_1, the power supply 120_1 provides the voltage V1, and the power good signal PGD1 is enabled (for example, at a high voltage level). In this case, the diode D1 receives a forward bias to be forward conducted, lowers the voltage V1 by a threshold voltage, and transmits the lowered voltage to the power receiving terminal PWD of the power consuming unit 110, in which the lowered voltage is used as a starting voltage VST. That is to say, the diode D1 outputs the starting voltage VST according to the voltage V1, and the starting voltage VST is lower than the voltage V1.

Before the power receiving terminal PWD of the power consuming unit 110 receives the starting voltage VST or the working voltage VCC, the power consuming unit 110 is in a not started state, so that the output terminals O1, O2, . . . are in a floating state. Since the gates of the transistors M1, M2, . . . do not receive any voltage, the transistors M1, M2, . . . are not conducted (equivalent to turn-off of the switches).

After the power receiving terminal PWD of the power consuming unit 110 receives the starting voltage VST, the power consuming unit 110 is in a working state. Since the power good signal PGD1 is enabled, the power consuming unit 110 enables the power control signal PCL1. That is to say, the power control signal PCL1 is switched from a high voltage level to a low voltage level. In this case, the voltage of the gate of the transistor M1 is far lower than the voltage of the source of the transistor M1, so that the transistor M1 is conducted, and transmits the voltage V1 to the power receiving terminal PWD of the power consuming unit 110, in which the voltage V1 is used as the working voltage VCC. The working voltage VCC is substantially equal to the voltage V1. In addition, since the working voltage VCC is substantially equal to the voltage V1, the diode D1 may be cut off due to the inadequate forward bias.

Moreover, when more than two of the power supply apparatuses 120_1, 120_2, . . . are switched on, the corresponding main boards are switched on. Assuming that the power supply apparatuses switched on are the power supply apparatuses 120_1 and 1202, the power supply 120_1 provides the voltage V1, the power supply 120_2 provides the voltage V2, and the power good signals PGD1 and PGD2 are enabled. In this case, the diodes D1 and D2 receive a forward bias. The diode that receives the voltage (e.g. V1 or V2) first between the diodes D1 and D2 is conducted first, and outputs the starting voltage VST to the power receiving terminal PWD of the power consuming unit 110 according to the voltage (e.g. V1 or V2), and the other diode is cut off instantly. Since the diodes D1 and D2 are forward conducted elements, the power supply apparatuses 120_1 and 1202 are prevented from being conducted to each other, thus avoiding reverse or unbalanced power supply. Assuming that the conducted diode is the diode D2, the diode D2 generates the starting voltage VST according to the voltage V2, and transmits the starting voltage VST to the power receiving terminal PWD of the power consuming unit 110.

Before the power receiving terminal PWD of the power consuming unit 110 receives the starting voltage VST and the working voltage VCC, the power consuming unit 110 is in a not started state, so that the output terminals O1, O2, . . . are in a floating state. Since the gates of the transistors M1, M2, . . . do not receive any voltage, the transistors M1, M2, . . . are not conducted. After the power receiving terminal PWD of the power consuming unit 110 receives the starting voltage VST, the power consuming unit 110 is in a working state. Since the power good signals PGD1 and PGD2 are enabled, the power consuming unit 110 enables one of the power control signals PCL1 and PCL2. The selection method may be performed in an order or randomly, and can be designed by persons of ordinary skill in the art, so the present invention is not limited thereto. Assuming that the power control signal PCL2 is enabled, the transistor M2 is conducted, and transmits the voltage V2 to the power receiving terminal PWD of the power consuming unit 110, in which the voltage V2 is used as the working voltage VCC. The working voltage VCC is substantially equal to the voltage V2. In addition, since the working voltage VCC is substantially equal to the voltage V2, the diodes D1 and D2 may be cut off due to the inadequate forward bias.

In view of the above, in the multiple power supply device according to the embodiments of the present invention, before the power consuming unit works, the diode that receives the voltage first is conducted, and outputs the starting voltage to the power consuming unit to actuate the power consuming unit. When the power consuming unit is in a working state, the power consuming unit may automatically select the received voltage as the working voltage according to the power good signal of the power supply apparatus. In addition, since the diodes are forward conducted elements, the power supply apparatuses are prevented from being conducted to each other, thus avoiding reverse or unbalanced power supply.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A multiple power supply device, comprising:
    a power consuming unit, having a power receiving terminal and a plurality of detection terminals, wherein the detection terminals receive a plurality of power good signals respectively, and the power consuming unit outputs a plurality of power control signals according to the power good signals, wherein the power consuming unit is a programmable chip;
    a plurality of power supply units, for outputting a plurality of working voltages respectively and outputting the power good signals correspondingly when outputting the working voltages; and
    a plurality of switching units, coupled to the power receiving terminal and respectively coupled to the power supply units for receiving the power control signals from the power consuming unit and the power working voltages from the power supply units, wherein
    when the power consuming unit is in a working state and one of the power good signals is enabled, the power consuming unit enables the corresponding power control signal, and one of the switching units transmit the corresponding working voltage to the power receiving terminal according to the enabled power control signal; while when the power consuming unit is in a working state and a part of the power good signals are enabled, the power consuming unit enables one of the power control signals corresponding to the enabled power good signals, and one of the switching units transmit the corresponding working voltage to the power receiving terminal according to the enabled power control signal.

2. The multiple power supply device according to claim 1, wherein when the power consuming unit is not started and one of the power supply units outputs the working voltage, the switching unit that receives the working voltage outputs a starting voltage to the power receiving terminal, so that the power consuming unit is actuated and starts working; while when the power consuming unit is not started and a part of the power supply units output the working voltages, one of the switching units that receive the working voltages outputs the starting voltage to the power receiving terminal.

3. The multiple power supply device according to claim 2, wherein each switching unit comprises:
    a switch, wherein a first terminal of the switch is coupled to a corresponding power supply unit, a second terminal of the switch is coupled to the power receiving terminal of the power consuming unit, and a control terminal of the switch receives the corresponding power control signal; and
    a diode, forward coupled between the first terminal and the second terminal of the switch, wherein
    when the power consuming unit is not started and one of the power supply units outputs the working voltage, the corresponding diode in the switching units is forward conducted, outputs the starting voltage according to the working voltage, and transmits the starting voltage to the power receiving terminal of the power consuming unit, so that the power consuming unit is actuated and starts working; when the power consuming unit is not started and a part of the power supply units output the working voltages, the diode that receives the working voltage first among the diodes in the switching units is forward conducted, outputs the starting voltage according to the received working voltage, and transmits the starting voltage to the power receiving terminal of the power consuming unit, so that the power consuming unit is actuated and starts working; when the power consuming unit is in a working state and one of the power good signals is enabled, the corresponding power control signal is enabled to conduct the corresponding switch in the switching units, and the working voltage is transmitted to the power receiving terminal of the power consuming unit through the conducted switch; and when the power consuming unit is in a working state and a part of the power good signals are enabled, one of the power control signals is enabled correspondingly to conduct the corresponding switch in the switching units, and the working voltage is transmitted to the power receiving terminal of the power consuming unit through the conducted switch.

4. The multiple power supply device according to claim 3, wherein when the power consuming unit is not started, all of the power good signals are disabled, and all of the switches are turned off.

5. The multiple power supply device according to claim 3, wherein when one of the diodes is forward conducted, the other diodes are all cut off.

6. The multiple power supply device according to claim 3, wherein the switches are P-channel metal-oxide-semiconductor (PMOS) transistors.

7. The multiple power supply device according to claim 2, wherein the starting voltage is lower than the working voltage.

8. The multiple power supply device according to claim 1, wherein the power supply units are a plurality of power supply apparatuses.

9. The multiple power supply device according to claim 1, wherein the power supply units are a plurality of power converters.

10. The multiple power supply device according to claim 1, wherein the programmable chip is a complex programmable logic device (CPLD) or a field programmable gate array (FPGA).

* * * * *